Sept. 5, 1961 J. JERGER, JR 2,999,027
METHOD OF GLASS MANUFACTURE
Filed May 17, 1954

INVENTOR
JOSEPH JERGER JR.

Mitchell & Bechert
ATTORNEYS

2,999,027
METHOD OF GLASS MANUFACTURE
Joseph Jerger, Jr., New Hyde Park, N.Y., assignor to Servo Corporation of America, New Hyde Park, N.Y., a corporation of New York
Filed May 17, 1954, Ser. No. 430,394
14 Claims. (Cl. 106—47)

This invention relates to methods for producing glasses comprising the fused heat-reaction product of arsenic and one or more of the elements from the B group of the VI column in the periodic table of elements, at least one of the compounding elements from said group being sulfur.

For optimum results in the manufacture of glasses of the character indicated, it is necessary either to use the purest raw materials possible or to refine the heat-reaction products of these elements. From the point of view of refining the raw materials, arsenic presents the greatest difficulty since at normal pressures it passes directly from the solid to the gaseous state on heating, and high temperatures are required for the sublimation. For these reasons, arsenic is not adaptable to simple refinement, as in a continuous distillation process.

In the case of infrared-transmitting glasses, the reaction product most frequently sought in the past has been arsenic trisulfide ($As_2S_3$), and attempts have been made to distill this compound. However, it has not always been possible through distillation to produce arsenic trisulfide as a certainty. The reason for this fact may be that, as some investigators have found, arsenic trisulfide does not have a discrete boiling point, and my experience confirms this observation. Also, the temperature necessary to completely distill over a liquid batch of arsenic trisulfide is 707° C., and before attainment of this temperature a certain fraction of the batch is distilled.

It is, accordingly, an object to provide an improved method of manufacturing glasses of the character indicated.

It is another object to provide an improved method more readily adaptable to continuous production.

It is a further object to provide an improved method of glass production in which the purity of ultimate glass components can be more reliably assured.

Other objects and various further features of the invention will be pointed out or will occur to those skilled in the art from a reading of the following specification in conjunction with the following drawings, wherein.

Briefly stated, my invention contemplates purification of the arsenic component of glasses of the character indicated by distilling arsenic disulfide ($As_2S_2$). This compound distills readily at the discrete boiling point of 565° C., representing the lowest boiling point of any arsenic-sulfur combination in the liquid phase. Therefore, by distilling arsenic disulfide, one may be assured of pure arsenic disulfide as a distillate. Depending upon the properties ultimately desired in the glass, my method further contemplates the subsequent addition of sulfur (or, if desired, at least one of the elements sulfur, selenium and tellurium from the B group of column VI of the periodic table) in order to produce the appropriate glass composition. Such glasses may fall within the areas delineated in each of several copending patent applications, including that in the name of W. H. Fraser, Serial No. 372,540, filed August 5, 1953, now abandoned, and that in the name of Joseph Jerger, Jr., Serial No. 417,724, filed March 22, 1954, now U.S. Patent No. 2,886,491, issued May 12, 1959.

In order to prepare arsenic disulfide for distillation in accordance with the present method, I prefer to react arsenic and sulfur (as commercially received) directly together by heating in a suitable vessel. These elements are reacted in their stoichiometric proportions, and I take particular precaution to assure against excess sulfur in order that the distillate may be pure arsenic disulfide. Distillation may take place in a vessel as described in copending patent application Serial No. 330,702, filed January 12, 1953, now Patent No. 2,886,491, in the name of Jerger et al. In such apparatus, a dam separates two heating chambers, the first of which may be used merely to melt the arsenic disulfide; in the second chamber the melted arsenic disulfide is heated to the boiling point, and the distilled vapors are collected in a suitable receiver. The receiver is preferably heated sufficiently (as to at least 307° C.) to maintain arsenic disulfide in the liquid state. By maintaining this heat at the receiver, I assure that any oxides formed in the process will be removed by vaporization from the receiver. The typical oxides thus removed are arsenic trioxide ($As_2O_3$), which sublimes at a temperature (193° C.) lower than the melting point of arsenic disulfide, and sulfur dioxide and sulfur trioxide, which are both gases at room temperature.

Figure 1:
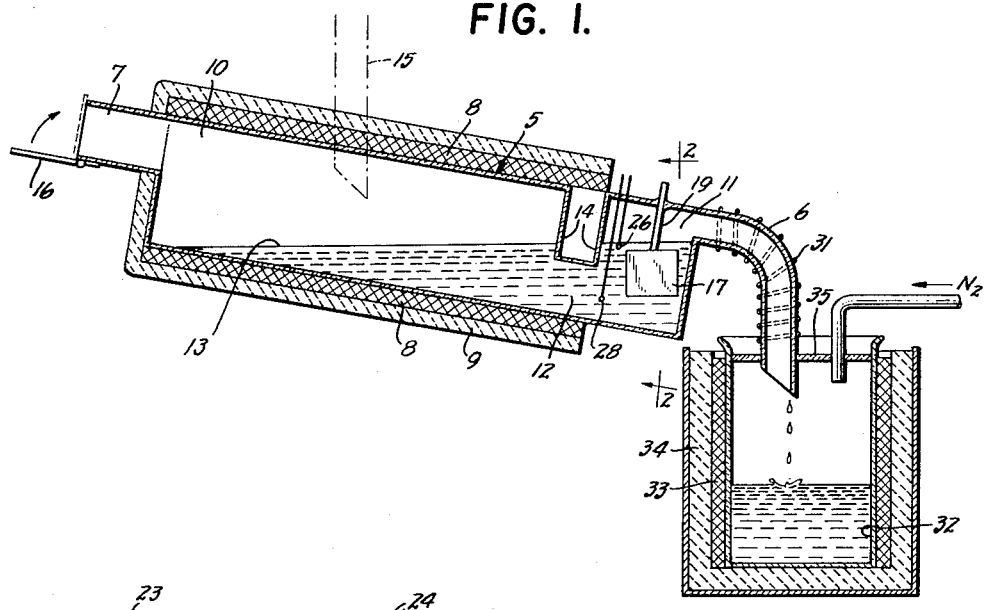
FIG. 1 is a simplified sectional view of a preferred refining apparatus which may be utilized in carrying out the method provided by the invention.
Figure 2:
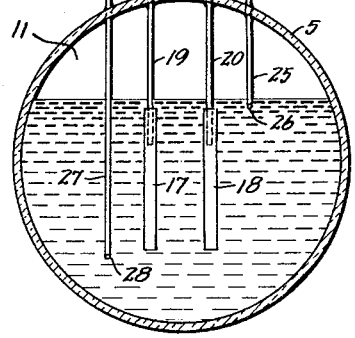
FIG. 2 is a sectional view of said apparatus taken in the plane 2—2 of FIG. 1 showing electrical connections to certain of the parts of FIG. 1.

The improved method of the invention will more clearly appear when described in conjunction with the use of the vessel disclosed in the aforementioned copending application Serial No. 330,702, illustrated herein as FIGS. 1 and 2.

Referring to FIGS. 1 and 2, the method employed may utilize chamber means 5 having a distillation exhaust outlet 6 and a loading inlet 7. The chamber means 5 is adapted to contain the material to be refined, in this case $As_2S_2$, and if such material is not conductive in the solid state, then the chamber means 5 may include melting or first heating means 8, such as a jacket of electrical heating coils, encompassing the substantial outer confines of the chamber means 5. The heating means 8 may itself be jacketed by insulation means 9, which may be a belt of refractory material, as suggested by the shading of the drawing.

The chamber means 5 may comprise two vessels 10—11 joined to each other by fluid-communicating means 12 located beneath the intended fluid level 13 so as to define baffle or trap means 14 between both chambers 10—11. However, in the form shown, the chamber means 5 is formed as a single structure which, for the refinement of certain low-melting point glasses, metallic selenium, metallic tellurium, and the like, may be of Pyrex glass, fused silica, or ceramic-coated stainless steel. This single structure is therefore formed with baffle 14 as a reentrant wall or barrier dividing the chamber means 5 into the two parts 10—11 already identified.

In certain cases, it may be desired to feed the leading or melting chamber 10 with liquid $As_2S_2$ material, as from a synthesizing unit (not shown); in that event, a vertically extending tube, suggested by the phantom outline 15, may project into the chamber 10 from above. However, for ordinary batch preparations, it will be found convenient to load solid material into the chamber 10 through a side-loading entrance 7 located above the liquid level 13. In order to prevent the exhaust of vaporous products from chamber 10, it is preferred that the loading inlet 7 shall include means 16 for closing off the inlet except when loaded. The means 16 may be a simple door or flap, spring-urged to closing position, as will be understood.

In carrying out the method of the invention, the melted material is refined by electric distillation in chamber means 5, achieved upon passing a sufficiently strong electric current through a localized volume of the melted material. For this purpose, two spaced electrodes 17—18 are shown having horizontally opposed substantial areas and contained within the volume beneath the fluid level 13 at the distillation end 11 of the chamber means 5. The electrodes 17—18 may be carbon-graphite plates and include means such as carbon electrode rods 19—20 for vertically suspending the electrode plates 17—18 in the fluid, and for energizing these plates. The rods 19—20 may be sealed, as by fusing at 21—22, to the chamber means 5 and brought externally for connection to a suitable electrical source; of course, if chamber means 5 is of fused quartz, carbon rods 19—20 cannot be fused thereto, but by using a refractory clay or cement at 21—22, an effectively air-tight seal may be produced upon drying. A conventional A.-C. source may be sufficient, and a transformer 23 is shown having a secondary connected across both plates 17—18 and with means 24 to regulate the applied voltage.

A liquid-level indicating means is provided within the boiling chamber 11. The indicating means may comprise a first electrode 25 contained within the chamber means 5 and effective at an upper level 26 corresponding substantially with the upper limit of the electrode plates 17—18. The electrode 25 may comprise a carbon rod, sealed to the chamber 11 in the same manner as described at 21—22. Similarly, a second indicating electrode 27 may have an effective level 28 substantially at the lower limit of the electrode plates 17—18 and may be sealed to the chamber 11. Single indicating means may be characterized by separate responses to circuit continuity through electrode 25 and to circuit continuity through electrode 27, but in the form shown separate indicators are illustrated. One of these indicators may suitably comprise a first lamp 29 electrically in series with a circuit to ground (mid-point of the transformer secondary) and through one (17) of the boiling electrodes; similarly, a second indicating lamp 30 may be connected electrically in series with another circuit to ground and through the other boiling electrode (18) and the other indicating electrode 27.

In operation, the $As_2S_2$ material to be refined may be introduced continuously or periodically through one of the means 7—15 and maintained in melted condition substantially at the level 13 by means of the heating element 8. In the distillation chamber 11, the heating occasioned by passage of electric current between electrodes 17—18 may boil the arsenic sulfide glass, and baffle 14 will prevent the discharge of boiling vapors at any point except through the distillation exhaust or condensing tube 6. Ordinarily, chamber means 5 should be loaded as near to the level 13 as possible, as indicated when both indicating lamps 29—30 are lighted; if the liquid drops below the level 13, then the upper lamp 30 will be extinguished and will thus display the need for a further supply. Finally, as when exhausting the chamber means 5, extinction of the lower lamp 29 will indicate that the electrodes 17—18 will no longer function to boil the melted glass.

In order to prevent freezing in the condensing tube 6, electric heating means 31 are used jacketing the tube and maintaining a melting temperature on the inner wall thereof. Condensed droplets may be collected in a receiver 32, which preferably includes heating means 33, for maintaining melting temperatures as long as a batch is being collected. Insulating means 34 may conserve the heating energy. In order to keep the room air out and the heat in the receiver 32, a removable closure 35 may be employed. If desired, a steady stream of an inert gas such as nitrogen may be fed into the receiver as long as the refined product is being collected, thus preventing oxidation of the product.

Having heated the distillate in the receiver sufficiently long to drive off the oxides mentioned above, the disulfide may either be cooled and stored in the solid state for future use as a raw material in manufacturing glasses, or the process may be continued to make any desired one of the glasses indicated. For example, one or more of the elements (excluding oxygen) from the B group of the VI column of the periodic table of elements may be separately or concurrently added to the receiver. Thus, solid or melted sulfur, selenium, or tellurium may be added in such proportions as to form the final desired glass composition; in the case of producing arsenic trisulfide, the incremental proportion of sulfur added to the distillate is such as to provide the stoichiometric proportions of the component elements. For addition of sulfur, a mere stirring or other simple mixing process is all that is needed to produce a homogeneous mixture for glass formation; for other additives (e.g. tellurium) of the same group, increased heating may be necessary. In any case, the glass is formed after mixing by cooling at a controlled rate to room temperature.

It will be seen that I have described a relatively simple process for assuring purity of the arsenic component of glasses of the character indicated. My method lends itself to continuous or to batch production, and reliably predictable results are achieved.

While I have described the invention in detail for a preferred method, it will be understood that modifications may be made within the scope of the invention as defined in the claims which follow.

I claim:

1. The method of forming a glass comprising arsenic and sulfur as constituent components, which comprises distilling arsenic disulfide, adding to the distillate as a further component at least one element selected from the group consisting of sulfur, selenium and tellurium, and homogeneously mixing the components in the liquid state.

2. The method of forming a glass comprising arsenic and sulfur as constituent components, which comprises reacting arsenic and sulfur in proportions to make arsenic disulfide, the proportion of sulfur being no greater than adequate to make arsenic disulfide, distilling the arsenic disulfide and adding to the distillate as a further component, at least one element selected from the group consisting of sulfur, selenium and tellurium, said components being homogeneously combined in the liquid state.

3. The method of forming a glass comprising arsenic and sulfur as constituent components, which comprises reacting arsenic and sulfur in proportions to make arsenic disulfide, the proportion of arsenic being no greater than adequate to make arsenic disulfide, distilling the arsenic disulfide and adding to the distillate as a further component at least one element selected from the group consisting of sulfur, selenium and tellurium, and combining said components in the liquid state.

4. The method of forming a glass comprising arsenic and sulfur as constituent components, which comprises reacting arsenic and sulfur directly by heating in stoichiometric proportions to form arsenic disulfide, distilling the arsenic disulfide, and adding to the distillate as a further component at least one of the elements selected from the group consisting of sulfur, selenium and tellurium, and mixing said components in the liquid state.

5. The method of forming a glass comprising arsenic and sulfur as constituent components, which comprises reacting arsenic and sulfur by heating in stoichiometric proportions to form arsenic disulfide, distilling the arsenic disulfide, maintaining the distillate at a temperature intermediate the melting and boiling points of arsenic disulfide, and adding to the distillate as a further component at least one element selected from the group consisting of sulfur, selenium and tellurium, and mixing said components in the liquid state.

6. The method according to claim 5, in which the said at least one element added to the distillate is in the solid state.

7. The method according to claim 5, in which the said at least one element added to the distillate is in the liquid state.

8. The method of producing arsenic trisulfide glass, which comprises reacting arsenic and sulfur in stoichiometric proportions to form arsenic disulfide, distilling the arsenic disulfide, adding elemental sulfur to the distillate, and mixing the sulfur and the distillate in the liquid state.

9. The method of claim 8, in which the incremental sulfur added to the distillate is such as to produce a substantially stoichiometric proportion of the component elements.

10. The method of forming a glass comprising arsenic and sulfur as constituent components, which comprises reacting arsenic and sulfur directly by heating in stoichiometric proportions to form arsenic disulfide, distilling the arsenic disulfide, and solidifying the distillate, and subsequently heat-reacting the distillate with a further component comprising at least one element selected from the group consisting of sulfur, selenium and tellurium.

11. The method of claim 10, wherein said reacting is at a temperature less than the distillation temperature of arsenic disulfide.

12. The method according to claim 10, in which the said at least one element added to the distillate is in the solid state.

13. The method according to claim 10, in which the said at least one element added to the distillate is in the liquid state.

14. The method of forming a glass comprising arsenic and sulfur as essential constituent components, which comprises boiling at substantially 565° C. a quantity of arsenic and sulfur in substantially the stoichiometric proportions of arsenic disulfide, condensing the vapors of such boiling, heating the condensate to maintain the same in the liquid phase, and mixing with the liquid condensate as a further component at least one element selected from the group consisting of sulfur, selenium, and tellurium.

References Cited in the file of this patent

UNITED STATES PATENTS 1,917,725    Lenander _____ July 11, 1933

OTHER REFERENCES

Silverman: "Use of Electrochemical . . . in Glass Making," Glass Industry, vol. 13, No. 8 (1932), pages 129–132.